US008607114B2

(12) United States Patent
Imai et al.

(10) Patent No.: US 8,607,114 B2
(45) Date of Patent: Dec. 10, 2013

(54) COMMUNICATION DEVICE AND COMMUNICATION METHOD

(75) Inventors: Satoru Imai, Yokohama (JP); Katsumi Sekiguchi, Yokohama (JP); Noriyoshi Meuchi, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 149 days.

(21) Appl. No.: 13/132,693

(22) PCT Filed: Dec. 2, 2009

(86) PCT No.: PCT/JP2009/006535
§ 371 (c)(1),
(2), (4) Date: Jun. 3, 2011

(87) PCT Pub. No.: WO2010/064421
PCT Pub. Date: Jun. 10, 2010

(65) Prior Publication Data
US 2011/0239073 A1  Sep. 29, 2011

(30) Foreign Application Priority Data
Dec. 5, 2008  (JP) ................................ 2008-310960

(51) Int. Cl.
*H04L 1/18*  (2006.01)
*H04L 1/00*  (2006.01)
*H04J 3/06*  (2006.01)

(52) U.S. Cl.
USPC .......... 714/748; 714/749; 370/216; 370/230; 370/235; 370/229; 370/517; 370/519

(58) Field of Classification Search
USPC .......... 714/748, 749; 370/216, 229, 230, 235, 370/517, 519
See application file for complete search history.

(56) References Cited

U.S. PATENT DOCUMENTS 7,397,759 B2 *  7/2008  Tan et al. ...................... 370/216
7,746,786 B2     6/2010  Ohishi et al.
(Continued)

FOREIGN PATENT DOCUMENTS

JP  08-008995 A    1/1996
JP  2002-534907 A  10/2002
(Continued)

OTHER PUBLICATIONS

Sarolahti et al., Forward RTO-Recovery (F-RTO): An Algorithm for Detecting Spurious Retransmission Timeouts with TCP, Sep. 9, 2008, Internet Engineering Task Force, pp. 1-21.*
Ramasivan, Enhanced Communication Services for Many-To-Many Multicasting Using XTP, Mar. 2000, National Library of Canada. pp. 1-114.*
Japanese Office Action w/English translation, dated May 15, 2012, 4 pages total.

(Continued)

*Primary Examiner* — John J Tabone, Jr.
(74) *Attorney, Agent, or Firm* — Crowell & Moring LLP

(57) ABSTRACT

In a case where the F-RTO algorithm is simply combined with the exponential backoff algorithm which is being suppressed, there is a problem in that once a spurious timeout occurs, the spurious timeout continuously occurs since then. In order to solve the above problem, according to the present invention, in a communication device for transmitting data segments and receiving acknowledgements in response to the data segments, respectively and sequentially, suppressing an application of a backoff algorithm for increasing a retransmission timeout period at the time of retransmitting a data segment, and controlling the retransmission timeout period to retransmit the data segment, the spurious timeout is determined based upon the acknowledgement received immediately after the retransmission of the data segment. In an event of determining the occurrence of the spurious timeout, the retransmission timeout is increased.

6 Claims, 8 Drawing Sheets

(56) References Cited

U.S. PATENT DOCUMENTS

| | | | |
|---|---|---|---|
| 7,821,924 B2* | 10/2010 | Haner et al. | 370/229 |
| 8,418,016 B2* | 4/2013 | Yamamoto et al. | 714/749 |
| 2002/0141353 A1* | 10/2002 | Ludwig et al. | 370/254 |
| 2004/0215753 A1* | 10/2004 | Chan et al. | 709/223 |
| 2005/0122995 A1 | 6/2005 | Meyer et al. | |
| 2005/0141419 A1* | 6/2005 | Bergamasco et al. | 370/230 |
| 2005/0144303 A1* | 6/2005 | Zhang et al. | 709/231 |
| 2005/0190720 A1 | 9/2005 | Miyake et al. | |

FOREIGN PATENT DOCUMENTS

| | | |
|---|---|---|
| JP | 2005-005906 A | 1/2005 |
| JP | 2005-236961 A | 9/2005 |
| JP | 2008-005021 A | 1/2008 |
| JP | 2008-219408 A | 9/2008 |

OTHER PUBLICATIONS

PCT/JP2009/006535 PCT/IB/338.
PCT/JP2009/006535 PCT/IB/373.
PCT/JP2009/006535 PCT/ISA/237 (Translation).
1. PCT/JP2009/006535 PCT/ISA/210.
J. Postel, "Transmission Control Protocol—DARPA Internet Program Protocol Specification", RFC793, Sep. 1981, 74 pages.
R. Braden, "Requirements for Internet Hosts—Communication Layers", RFC1122, Oct. 1989, 96 pages.
P. Sarolahti, et al., "F-RTO: An Enhanced Recovery Algorithm for TCP Retransmission Timeouts", ACM SIGCOMM Computer Communications Review, Apr. 2003, vol. 33, No. 2, pp. 51-63.
Chinese Office Action dated Jun. 3, 2013 with English translation (Thirteen (13) pages).

* cited by examiner

F I G. 4
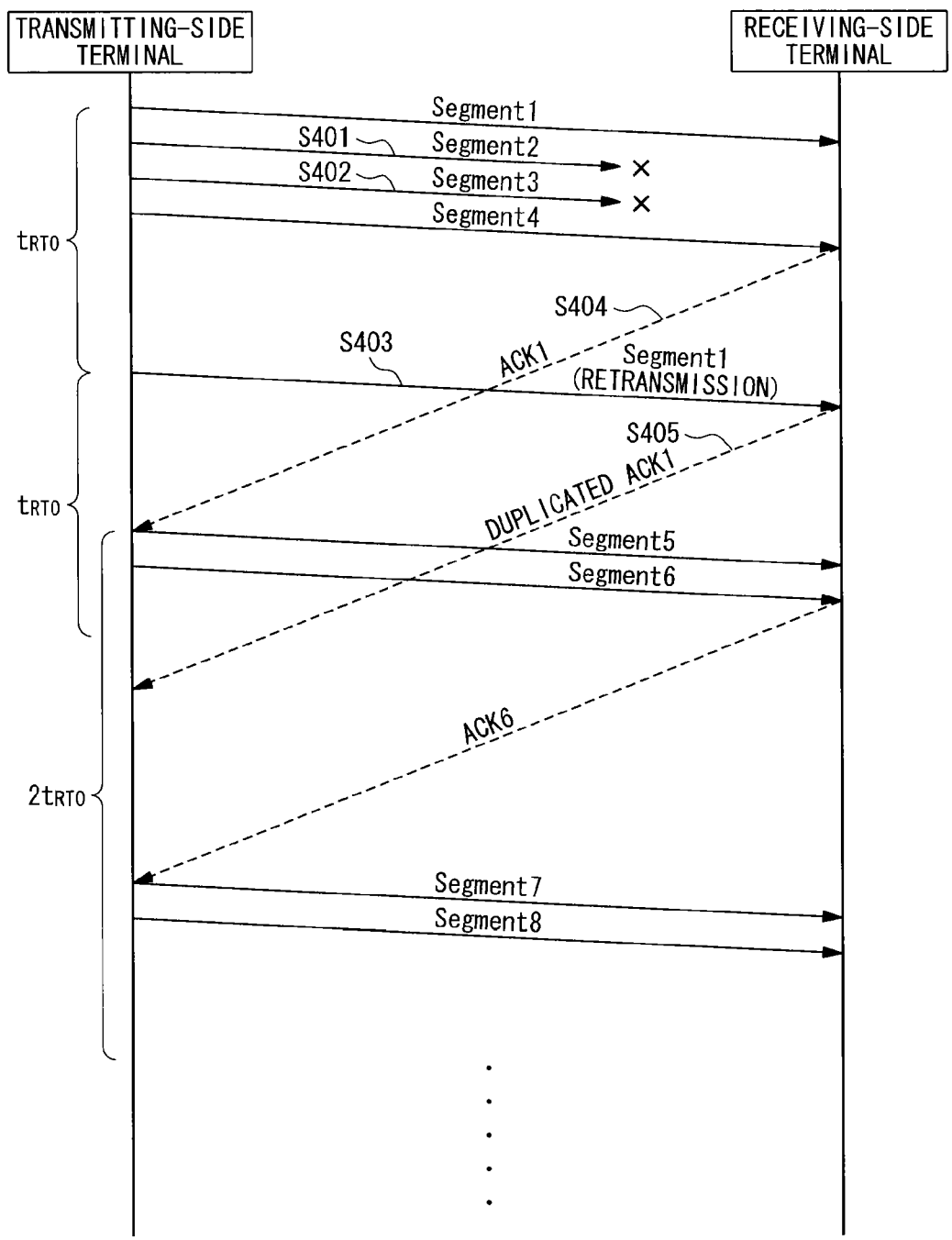

COMMUNICATION DEVICE AND COMMUNICATION METHOD

TECHNICAL FIELD

The present invention relates to a retransmission control method for the event when a retransmission timeout occurs in transmitting data via a network.

BACKGROUND ART

When data is transmitted and received over a communication network where data can be lost, the possibility of a data loss in the communication network is detected to transmit all the data from a transmitter to a receiver, and such lost data is retransmitted from the transmitter in some cases.

In the Internet Protocol (IP) based networks such as the Internet, according to Transmission Control Protocol (TCP) generally used for transmission and reception without a data loss, the transmitter sequentially divides the transmission data into partial data. Such divided partial data each is applied with a header including a sequence number to generate data for a unit of transmission (hereinafter, referred to as "segment"). Thus generated segments are transmitted in ascending order of the sequence number. In this case, the transmitter records information on the transmission times of the segments. The transmitter has a function of controlling the retransmission of a segment, unless the transmitter can receive an ACKnowledgement (ACK) in response to the transmitted segment from the receiver within a certain period.

This certain period is held by the transmitter beforehand as a retransmission timeout period, and is updated based upon a measurement result of a Round Trip Time (RTT) between the transmitter and the receiver (Non-Patent Document 1). Additionally, when the segment is retransmitted, the doubled value is set to the retransmission timeout period. The exponential backoff algorithm for avoiding network congestion caused by retransmission is included (Non-Patent Document 2).

Furthermore, unlike a wired data link, the throughput in a wireless data link drastically fluctuates. Therefore, there is a communication protocol for a data link for specifying the retransmission of data frames, such as a Radio Link Control (RLC) protocol. When the data link where the retransmission of the data frame is specified is used as a lower layer of the TCP layer, the situation in which a data frame is lost in the data link and then retransmitted is regarded as an increase in the RTT, by the TCP. When the retransmission continues for a limited period of time in the data link and the arrival of the data frame cannot be confirmed within the continued period of time for retransmission, the data frame is considered lost, that is, the segment is considered lost. Accordingly, an upper limit is given to the RTT in the TCP by the continued period of time for retransmission, as a matter of course.

There is a proposal of a technique for enjoying the following both advantages by focusing on the existence of the upper limit of the RTT in the TCP. The first advantage is to suppress the TCP retransmission that continues in the data link by setting the value of the retransmission timeout period before the retransmission occurs in consideration of the upper limit of the RTT. The second advantage is to avoid the congestion caused by retransmission by applying the exponential backoff algorithm from n+1 times or later (Patent Document 1).

In the network environment where the RTT varies over time, however, the retransmission timeout period in the TCP retransmission control is sometimes shorter than the actual RTT. If the retransmission timeout period is shorter than the RTT, a segment might be retransmitted, although the segment is not lost between the transmitter and the receiver. The situation where such a segment retransmission occurs is known as spurious timeout, and can be a cause of degrading the communication throughput.

As a method for detecting the spurious timeout, Forward RTO-Recovery (F-RTO) is known. As to F-RTO, the transmitter transmits two of new untransmitted segments in ascending order of the sequence number, in an event when the retransmission timer expires (hereinafter, referred to as "timeout"). Subsequent to the transmissions of these segments, whether the timeout is caused by a segment loss or a spurious timeout is determined by the content of an ACK firstly received from the receiver in response to the transmissions of those two segments. Specifically, in some cases where the sequence number of the segment, the receipt of which has been confirmed by the received ACK, is greater than the previously received ACK, the timeout is determined to be caused by the spurious timeout. In other cases, the timeout is determined to be caused by the segment loss. When the timeout is determined to be caused by the spurious timeout, subsequent segments are continuously transmitted, whereas when the timeout is determined to be caused by the segment loss, the lost segment is retransmitted and the receiver receives the segment, then subsequent segments are transmitted (Non-Patent Document 3).

In addition, in a case where the data link in which the retransmission of data frame is specified is employed for a lower layer of the TCP layer, if the buffer size for storing the retransmitted frames at the receiver is large enough, any frame won't be lost in the data link. Therefore, even if the retransmission timeout period is set shorter than the upper limit of the RTT, the possibility of an occurrence of the spurious timeout is merely increased. There is no effect to achieve a chance of earlier retransmission and recovery.

In reality, however, there is a limit in the buffer size for storing the retransmitted frames. If the frame bigger than the buffer size is input into the data link, the data will be discarded. That is to say, while there is a disadvantage in that the number of spurious timeouts is increased by making the retransmission timeout period shorter than the upper limit of the RTT, an advantageous chance of earlier retransmission and recovery is obtainable.

In such a situation, by simply combining the transmitter according to the conventional technique described in Patent Document 1 with the conventional technique described in Non-Patent Document 3, it is easily conceivable that the chance of earlier retransmission and recovery chance is achievable while alleviating the disadvantage caused by the occurrence of the spurious timeout.

PRIOR ART DOCUMENTS

Patent Documents
Patent Document 1: JP 2005-236961 A
Non-Patent Documents
Non-Patent Document 1: J. Postel, "Transmission Control Protocol—DARPA Internet Program Protocol Specification", RFC793, September 1981.
Non-Patent Document 2: R. Braden, "Requirements for Internet Hosts—Communication Layers", RFC1122, October 1989.
Non-Patent Document 3: P. Sarolahti, M. Kojo, and K. Raatikainen, "F-RTO: An Enhanced Recovery Algorithm for TCP Retransmission Timeouts", ACM SIGCOMM Computer Communications Review, April 2003, Volume 33, Number 2, p. 51-63.

SUMMARY OF THE INVENTION

Problem to be Solved by the Invention

It should be noted that, however, there is a following problem when the transmitter described in Patent Document 1 is simply combined with the F-RTO algorithm described in Non-Patent Document 3. FIG. 9 is a view describing a problem in the conventional technique. Specifically, in FIG. 9, it is supposed that the delayed ACK is employed. Assuming that a transmitting-side terminal firstly transmits Segment 1 and Segment 2 to a receiving-side terminal (S901, S901'), and then an ACK 2 from the receiving-side terminal in response thereto (S902) is received after the retransmission timeout period $t_{RTO}$ has passed since Segment 1 (S901) is transmitted (occurrence of spurious timeout).

In this case, the occurrence of the timeout causes the transmitting-side terminal to retransmit Segment 1 (S903). However, if the application of the backoff algorithm is suppressed for the retransmission timeout period, the retransmission timeout period in this case is $t_{RTO}$. Moreover, according to the F-RTO algorithm, subsequent to the reception of ACK 2 (S902), two untransmitted segments that are Segment 5 and Segment 6 are transmitted (S904, S905). After these segments are transmitted, the timeout of the first Segment 1 (S901) is determined to be the spurious timeout if the sequence number of the firstly received ACK (S906) is incremented, whereas if the sequence number is not incremented, the timeout is determined to be caused by the segment loss or the like. As shown in FIG. 9, when the received ACK is ACK 4 (S906), the sequence number is incremented, so that the timeout of Segment 1 (S901) is determined to be the spurious timeout.

In a case where the application of the backoff algorithm is suppressed for the retransmission timeout period, however, the period $t_{RTO}$ is set as the retransmission timeout period for the transmission of Segment 5 (S904). Accordingly, there is a high possibility that the ACK 6 (S907) in response to Segment 5 (and Segment 6) incurs a spurious timeout. If the spurious timeout is determined, Segment 5 needs to be retransmitted (S908) while Segment 7 and Segment 8 that are untransmitted segments is to be transmitted (S909, S910).

In this situation, the retransmission timeout period in the retransmission of Segment 5 (S908) is updated by measuring the RTT from the transmission of Segment 4 to the receipt of the ACK 4 (S906). However, in a case where the retransmission timeout period $t_{RTO}$ is shorter than the RTT and, for example, the period $t_{RTO}$ is the minimum value of the retransmission timeout period, the retransmission timeout period $t_{RTO}$ of Segment 5 (S908) satisfies $t_{RTO} < t'_{RTO} < RTT$. Therefore, there is a high possibility that Segment 5 (S908) incurs a spurious timeout. From then, the spurious timeout will continuously occur in the same manner.

In other words, if the transmitter described in patent Document 1 is merely combined with the F-RTO algorithm, there is a problem in that once the spurious timeout occurs, the spurious timeout continuously occurs from then. That is, if the spurious timeout occurs with the retransmission timeout period being shorter than the RTT, the transmitter transmits two of new untransmitted segments. If the retransmission timeout period is not backed off and a short period is set thereto, the ACK in response to the segment firstly determined to incur the spurious timeout will be received, the spurious timeout will occur at a new untransmitted segment after the retransmission and recovery, and then two of the new untransmitted segments will be transmitted. These operations will be repeated. In addition, a similar problem will occur at not only a case where the F-RTO algorithm is employed for detection of the spurious timeout but also a case where another algorithm is employed, as long as the algorithm is so employed as to transmit one or more untransmitted segments in response to the receipt of the first ACK after the retransmission of the segment determined to be the timeout.

Accordingly, the present invention has been made to address the above problems, and has an object of providing a communication device and a communication method, whereby the chance of earlier retransmission and recovery is achieved at the time of the occurrence of retransmission, while the degradation in the throughput caused by the spurious timeout is being suppressed.

Solution to the Problem

In order to achieve the above object, according to an aspect of the present invention, there is provided a communication device for transmitting data segments and receiving acknowledgements in response to the data segments, respectively and sequentially, suppressing an application of a backoff algorithm for increasing a retransmission timeout period at the time of retransmitting a data segment, and controlling the retransmission timeout period to retransmit the data segment, the communication device comprising: a spurious timeout determination unit for determining a spurious timeout based upon an acknowledgement received immediately after the retransmission of the data segment; and a retransmission timeout increase unit for increasing the retransmission timeout period, when an occurrence of the spurious timeout is determined by the spurious timeout determination unit.

In the above configuration, even in a case where a spurious timeout occurs while the application of backoff algorithm is being suppressed, the retransmission timeout period can be increased. This avoids a situation where once a spurious timeout occurs, the spurious timeout continuously occurs since then.

In the above communication device, the acknowledgements may be applied with sequence numbers, respectively, and wherein the spurious timeout determination unit may determine the occurrence of the spurious timeout, when a sequence number of a first acknowledgement received immediately after the retransmission of the data segment is greater than a previous one, and when a sequence number of a second acknowledgement received immediately after the first acknowledgement is greater than the previous one.

In the above configuration, whether or not the occurred timeout is a spurious one determines based upon the acknowledgement received immediately after the retransmission of the data segment, so that the retransmission timeout period can be increased. This avoids a situation where once a spurious timeout occurs, the spurious timeout continuously occurs since then.

In addition, the retransmission timeout increase unit may increase the retransmission timeout period for transmitting at least one new data segment in response to the first acknowledgement received immediately after the retransmission of the data segment, while the application of the backoff algorithm being suppressed.

In the above configuration, the retransmission timeout period can be increased for at least one new data segment to be transmitted after the first acknowledgement is received. This avoids a situation where once a spurious timeout occurs, the spurious timeout continuously occurs since then.

Furthermore, the retransmission timeout increase unit may double the retransmission timeout period.

In the above configuration, the retransmission timeout period after the data segment is retransmitted can be doubled, thereby increasing the possibility of avoiding a situation where once a spurious timeout occurs, the spurious timeout continuously occurs since then.

Moreover, the spurious timeout determination unit may determine the spurious timeout with a Forward RTO-Recovery (F-RTO) algorithm.

In the above configuration, when the backoff algorithm is suppressed at the time of retransmission of the data segment and the spurious timeout can be detected by use of F-RTO, the retransmission timeout period at the time of retransmission of the data segment can be increased. This avoids a situation where once a spurious timeout occurs, the spurious timeout continuously occurs since then.

Additionally, according to another aspect of the present invention, there is provided a communication method for transmitting data segments and receiving acknowledgements in response to the data segments, respectively and sequentially, suppressing an application of a backoff algorithm for increasing a retransmission timeout period at the time of retransmitting a data segment, and controlling the retransmission timeout period to retransmit the data segment, the communication method comprising: determining a spurious timeout based upon an acknowledgement received immediately after the retransmission of the data segment (which corresponds to step S809 of FIG. 8, for example); and increasing the retransmission timeout period, when an occurrence of the spurious timeout is determined by the spurious timeout determination unit (which corresponds to step S808 of FIG. 8, for example).

In the above configuration, even in a case where a spurious timeout occurs while the application of backoff algorithm is being suppressed, the retransmission timeout period can be increased. This avoids a situation where once a spurious timeout occurs, the spurious timeout continuously occurs since then.

Advantageous Effects of the Invention

As described heretofore, according to an aspect of the present invention, in a case of retransmission of data segment where a spurious timeout occurs while the application of backoff algorithm is being suppressed, it is capable of avoiding a situation where once a spurious timeout occurs, the spurious timeout continuously occurs since then.

BRIEF DESCRIPTION OF THE DRAWINGS

FIG. 4 is a view illustrative of a concrete example of transmission due to a segment loss;

DESCRIPTION OF EMBODIMENTS

Figure 1:
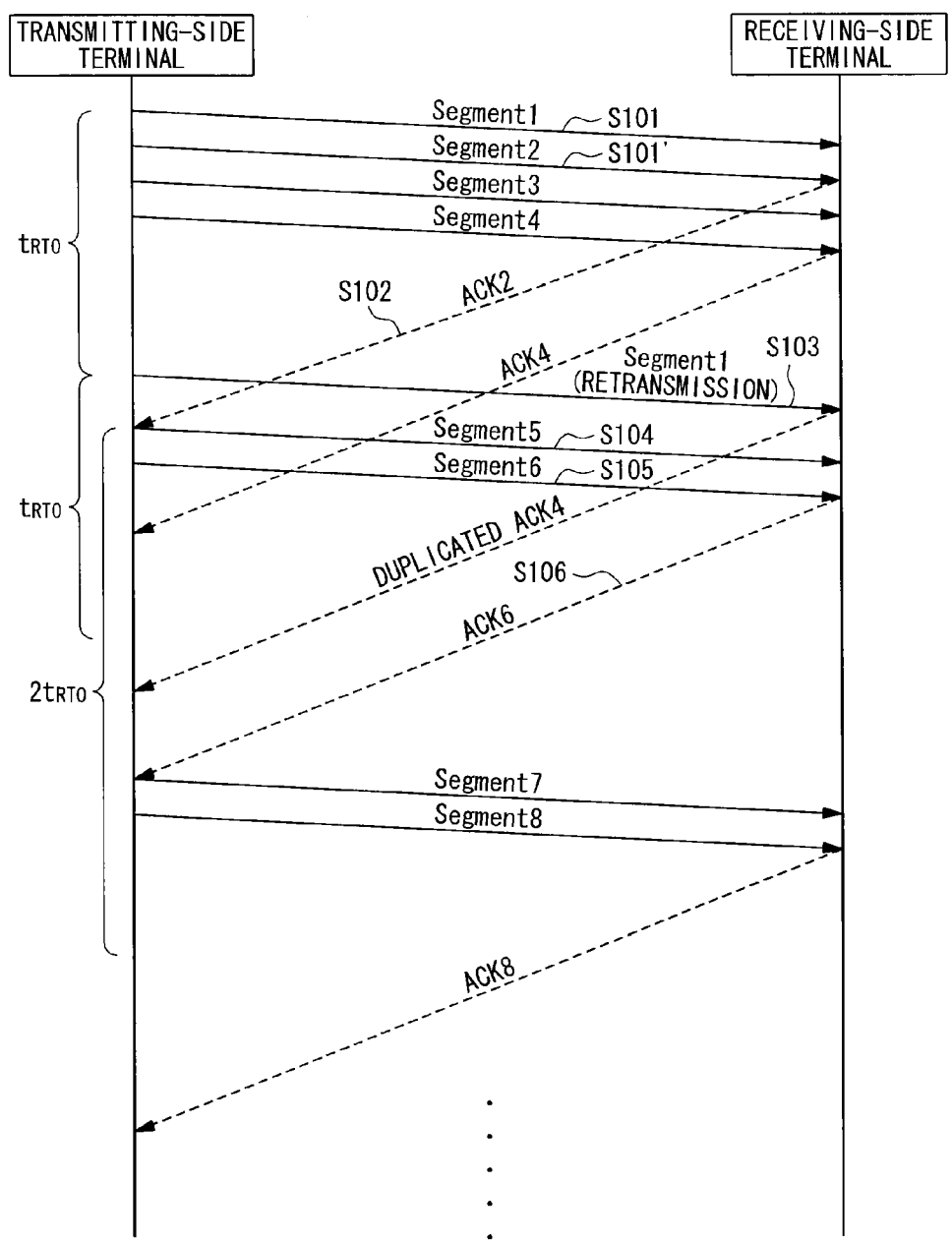
FIG. 1 is a view illustrative of operations of a communication device according to the present embodiment.

Hereinafter, embodiments of the present invention will be described with reference to the drawings.
(Operation Outline)

Firstly, the operation outline of a communication device according to the present embodiment will be described with reference to FIG. 1. Specifically, in FIG. 1, it is supposed that the delayed ACK is employed.

In the beginning, a transmitting-side terminal (corresponding to a communication device according to the present embodiment) transmits Segment 1 and Segment 2 to a receiving-side terminal (S101, S101'). In response thereto, ACK 2 (S102) is received after the period $t_{RTO}$ that is a transmission timeout period has passed since Segment 1 (S101) is transmitted (occurrence of spurious timeout). The transmitting-side terminal retransmits Segment 1 with the application of backoff algorithm being suppressed for the retransmission timeout period. Moreover, after ACK 2 (S102) is received, Segment 5 and Segment 6 that are new untransmitted segments are transmitted (S104, S105) in compliance with F-RTO algorithm. The spurious timeout of ACK 6 (S106) in response to Segment 5 (and Segment 6) can be avoided by increasing, for example, doubling the retransmission timeout period in this case.
(Configuration of Communication Device)

Next, a configuration example of a communication system including a server device that is a communication device according to the present embodiment will be described with reference to FIG. 2. The communication system illustrated in FIG. 2 includes a server device 10, a wireless network 1, a radio controller 20, and a communication terminal 30. Additionally, FIG. 3 is a view illustrative of a protocol stack in the communication system according to the present embodiment. L1 and L2 correspond to the physical layer and the data link layer in the Open System Interconnection (OSI) reference model, respectively.

IP corresponds to the network layer, whereas TCP corresponds to the transport layer. That is to say, the server device 10 and the communication device 30 communicate with each other according to the TCP in the transport layer of the OSI reference model. In the TCP, the communication is made to wait for an ACK indicating that data is received with certainty for every data transmission, namely, a confirmation-type communication is established.

Referring back to FIG. 2, the wireless network 1 is, to be specific, a WAN or a LAN to which a wireless LAN is connected, a switched network of a mobile telephone system and a WAN or a LAN connected thereto, or the Internet.

The server device 10 transmits data to the communication terminal 30 via the wireless network 1 and the radio controller 20. Additionally, the server device 10 includes a transmission unit 101, a timeout determination unit 102, a retransmission unit 103, a spurious timeout determination unit 104, and a retransmission timeout period increase unit 105. The server device 10 is implemented by use of, for example, a server or workstation.

The transmission unit 101 transmits through the wireless network 1 to the communication device 30 the segments that have been generated by dividing the transmission data into plural segments. Each segment is applied with a header including a sequence number, so that the segments is transmitted to the communication device 30 in ascending order of the sequence number.

The timeout determination unit 102 holds a transmission time when the transmission unit 101 transmits a segment, and determines that a timeout occurs if an ACK for the segment has not been received for a certain period of time since the transmission time, namely within a retransmission timeout period. It is to be noted that when the retransmission timeout period is set shorter than the RTT, the spurious timeout easily occurs. Hence, in such a case, in particular, a retransmission control of the communication device according to the present invention is effective.

The retransmission unit 103 does not apply the backoff algorithm for the retransmission timeout period until the n-time retransmission (where n is a positive integer) when the timeout determination unit 102 determines that a timeout has occurred. The retransmission unit 103 applies the backoff algorithm for the retransmission timeout period in more than n-time retransmission, so as to cause the transmission unit 101 to retransmit the segment to which the timeout is applied. The backoff algorithm is an algorithm for increasing the retransmission timeout period at the time of segment retransmission. As a typical one, an exponential backoff algorithm for exponentially increasing the retransmission timeout period is known.

The spurious timeout determination unit 104 determines whether or not the timeout occurred at the timeout determination unit 102 is a spurious timeout, based upon an acknowledgement received immediately after the segment retransmission. The "acknowledgement" is information indicating that the segment transmitted from the server device 10 has been received by the communication terminal 30, and corresponds to an ACK or the like in the TCP/IP in concrete terms.

(Spurious Timeout Determination Unit)

The spurious timeout determination unit 104 determines the occurrence of the spurious timeout, in a case where the sequence number of the first acknowledgement received immediately after the retransmission of the segment retransmitted by the retransmission unit 103 is greater than that is previously received, and the sequence number of the second acknowledgement received immediately after the first acknowledgement is greater than that previously received.

For example, in the example of FIG. 1, in an event when the spurious timeout occurs at Segment 1 (S101) transmitted from the transmission unit 101, subsequent to the occurrence of the timeout, the retransmission unit 103 causes the transmission unit 101 to retransmit the timeout Segment 1 (S103). Then, ACK 2 that is the first acknowledgement in response to the first segment will be received (S102). In this case, the sequence number of the received acknowledgement ACK 1 is greater than that previously received. If the sequence number of the received acknowledgement is not incremented, which means that it is not an acknowledgement in response to the first segment and it is a duplicated ACK or the like in response to a segment transmitted therebefore.

It should be noted that, however, even if the sequence number of the acknowledgement is incremented in such a situation, the timeout occurred cannot be determined to be a spurious timeout promptly by this fact only. This is because even if Segment 2 or Segment 3 is lost for some reason as illustrated in FIG. 4 (S401, S402), the sequence number of the ACK 1 (S404) that is an acknowledgement received immediately after the retransmission of Segment 1 (S403) is incremented.

Hence, the spurious timeout determination unit 104 checks whether or not the sequence number of the second acknowledgement received immediately after the first acknowledgement is incremented. In this situation, the second acknowledgement corresponds to ACK 4 in FIG. 1 or a duplicated ACK 1 (S405) in FIG. 4. As illustrated in FIG. 1, when the timeout of the first segment is a spurious timeout, the second acknowledgement is ACK 4. Therefore, the sequence number is incremented. On the other hand, as illustrated in FIG. 4, in an event when the timeout occurs due to a segment loss, the second acknowledgement is a duplicated ACK (S405). Therefore, the sequence number is not incremented.

As described heretofore, the spurious timeout determination unit 104 determines that the timeout should be the spurious timeout, in a case where the sequence number of the first acknowledgement received immediately after the segment is retransmitted by the retransmission unit 103 is greater than that previously received, and the sequence number of the second acknowledgement received immediately after the first acknowledgement is incremented.

(Retransmission Timeout Period Increase Unit)

Referring back to FIG. 2, the retransmission timeout period increase unit 105 increases the retransmission timeout period, when the spurious timeout determination unit 104 determines that a spurious timeout occurs. What percentage should be increased may be, for example, a double like the exponential backoff algorithm, or maybe another percentage.

Additionally, in more detail, the retransmission timeout period increase unit 105 increases the retransmission timeout period for transmitting at least one new data segment to be transmitted in accordance with the first acknowledgement received immediately after the retransmission unit 103 retransmits the segment, while the application of the above backoff algorithm is being suppressed for the retransmission timeout period.

Figure 9:
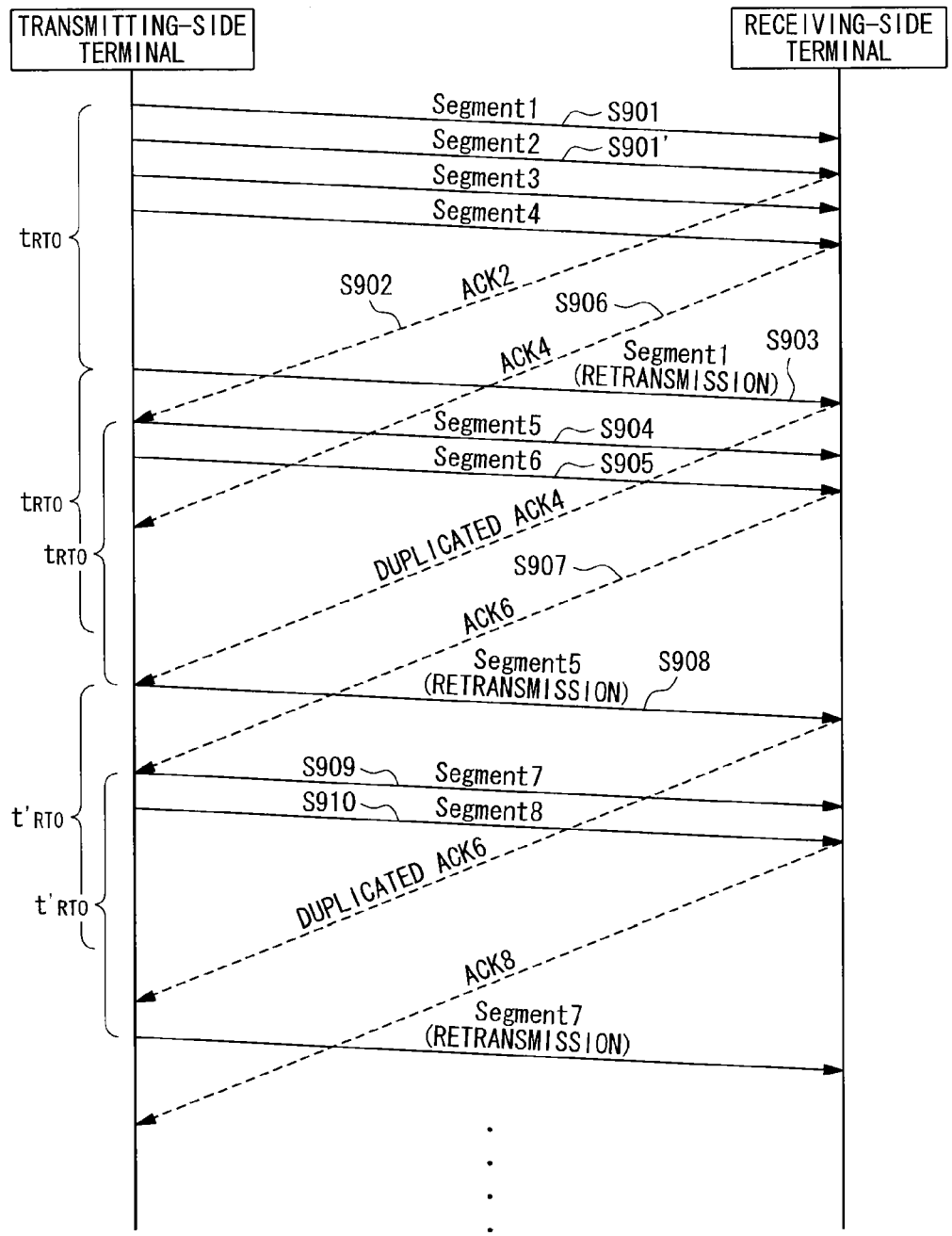
FIG. 9 is a view explaining a problem in a conventional technique.

In this situation, the limitation is given to the case where the backoff algorithm is being suppressed. This is because, as described with reference to FIG. 9, the problem to be solved by the present invention is to avoid a retransmission timeout caused by transmitting a new untransmitted segment to be transmitted subsequently within the same retransmission timeout period, after the first acknowledgement is received after the retransmission timeout has passed.

Accordingly, if the backoff algorithm is applied at the time of transmission of the untransmitted segment, the retransmission timeout period needs not to be increased. The retransmission timeout period may be increased only as far as the backoff algorithm is not applied. In addition, at least one new data segment to be transmitted in accordance with the first acknowledgement, which has been received immediately after the segment is retransmitted by retransmission unit 103, correspond to Segment 5 (S104) or Segment 6 (S105) in the example of FIG. 1. Furthermore, although two new data segments are transmitted (S104, S105) in FIG. 1, the same effect will be obtained according to the present invention even if only one data segment is transmitted.

Figure 2:
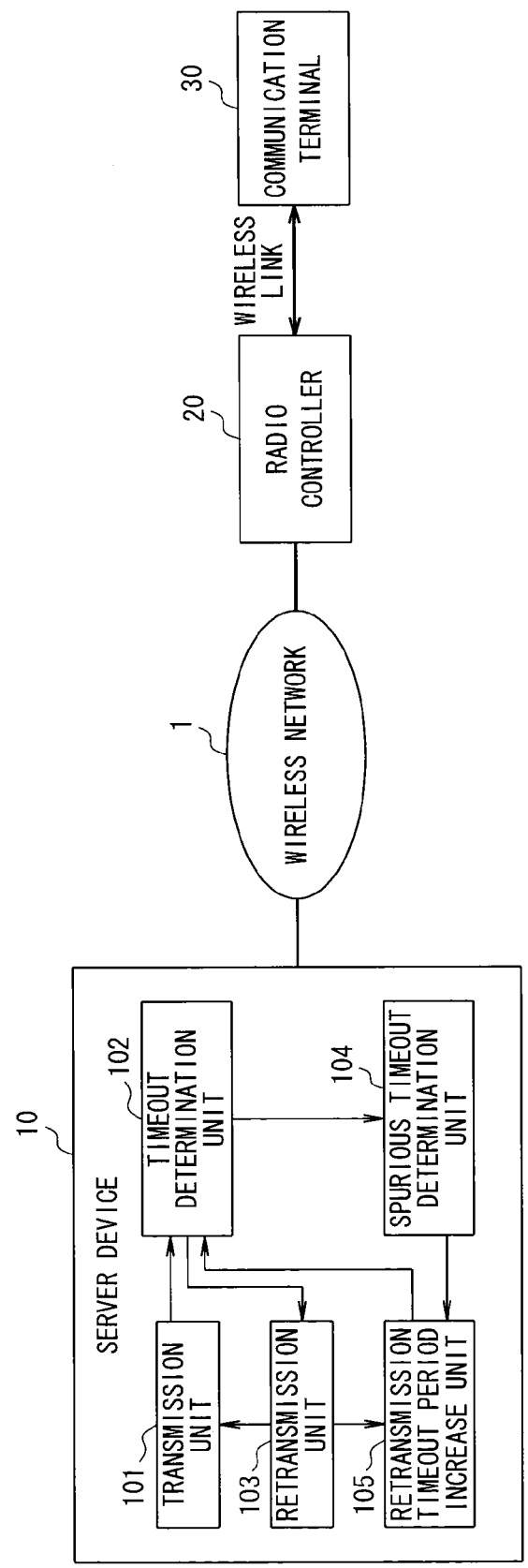
FIG. 2 is a view illustrative of a configuration example of a communication system according to the present embodiment.
Figure 3:
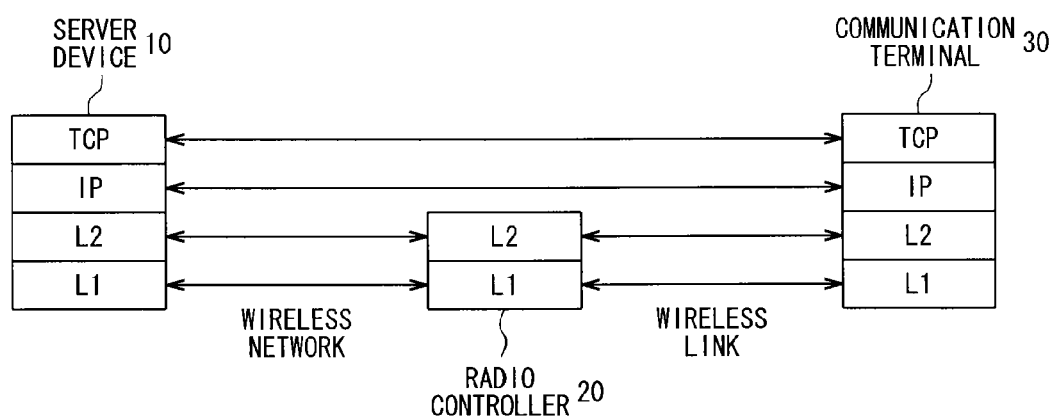
FIG. 3 is a view illustrative of a protocol stack in the communication system according to the present embodiment.

Moreover, FIG. 2 illustrates an example where the server device 10 and the communication terminal 30 communicate with each other. However, any communication device instead of the server device 10 maybe employed for transmitting data to the communication terminal 30 in accordance with the TCP communication. As an example, a mobile telephone terminal or the like may be employed.

(Concrete Configuration Example of Server Device)

Figure 5:
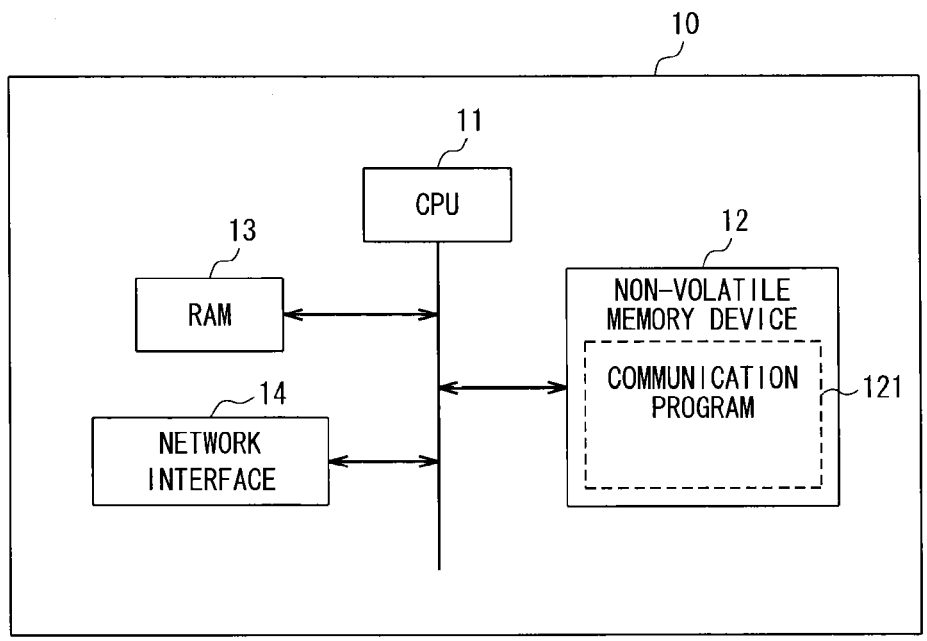
FIG. 5 is a block diagram illustrative of a configuration example of a server device according to the present embodiment.

A specific configuration example of the server device 10 according to the present embodiment will now be described. FIG. 5 is a block diagram illustrative of a configuration example of the server device 10. Referring to FIG. 5, the server device 10 is provided with a Central Processing Unit (CPU) 11, a non-volatile memory device 12, a Random Access Memory (RAM) 13, and a network interface 14.

The server device 10 performs various processes by causing the CPU 11 to execute programs stored in the non-volatile memory device 12 with the RAM 13 used as a work area, in the same manner as a general computer. The non-volatile memory device 12 is a memory device that holds the memory without being supplied with the power source, and examples thereof are Read Only Memory (ROM), flash memory, ferroelectric memory, magnetoresistive memory, magnetic disk, optical disk, magnetic tape, and the like.

The non-volatile memory device 12 stores a control program (not illustrated) for executing the operations of the programs, and a communication program 121 for executing communication processes in accordance with the TCP.

In addition, the communication program 121 includes modules corresponding to the above-described transmission unit 101, the timeout determination unit 102, the retransmission unit 103, the spurious timeout determination unit 104, and the retransmission timeout period increase unit 105.

The modules are deployed by the RAM 13 and executed by the CPU 11, as needed. Furthermore, the network interface 14 is a wired or wireless communication interface for transmission and reception of data with the wireless network 1.

(Radio Controller)

Referring back to FIG. 2, the radio controller 20 is connected through a wireless link with the communication terminal 30, and functions as a wireless interface between the communication terminal 30 and the wireless network 1. An example of the radio controller 20, specifically speaking, is an Access point (AP) of a wireless LAN or a Radio Access Network (RAN) of a mobile telephone system.

(Communication Terminal)

The communication terminal 30 receives segments transmitted from the server device 10. Examples of the communication terminal 30 are, specifically speaking, mobile telephone terminals and personal computers (PC) equipped with radio communication functionality.

(Specific Configuration of Communication Terminal)

Figure 6:
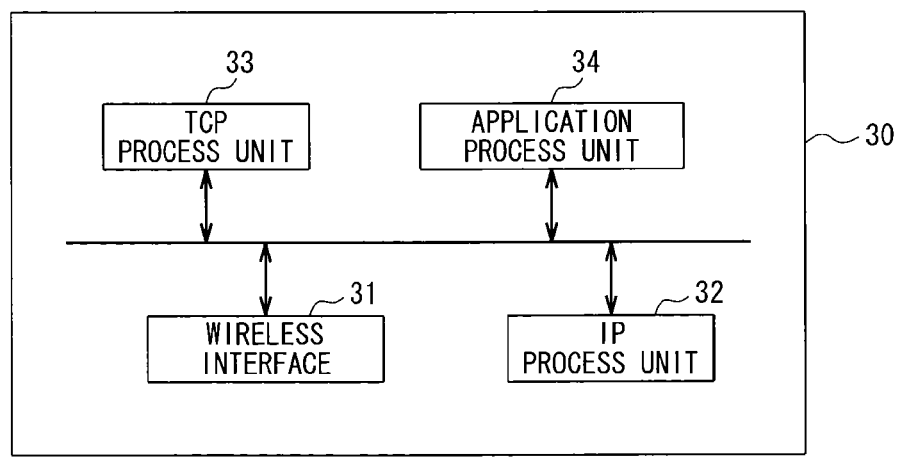
FIG. 6 is a block diagram illustrative of a configuration example of a communication terminal according to the present embodiment.

Next, a specific configuration example of the communication terminal 30 according to the present embodiment will be described. FIG. 6 is a block diagram illustrative of a configuration example of the communication terminal 30. Referring to FIG. 6, the communication terminal 30 is provided with a wireless interface 31, an IP process unit 32, a TCP process unit 33, and an application process unit 34.

The wireless interface 31 functions as an interface with the wireless network 1. To be more specific, the wireless interface 31 is provided with an antenna, a high-frequency process unit, and a baseband process unit (not illustrated).

The IP process unit 32 is identified on the wireless network 1 with an IP address assigned from the wireless network 1 or a unique address set by a user to the communication terminal 30.

The TCP process unit 33 controls retransmission and congestion. This achieves communication with higher reliability.

The application process unit 34 has functionality of implementing applications used by a user, such as a Web browser, a File Transfer Protocol (FTP) client, a mail client, and the like.

(Process Flow of the Server Device)

Figure 7:
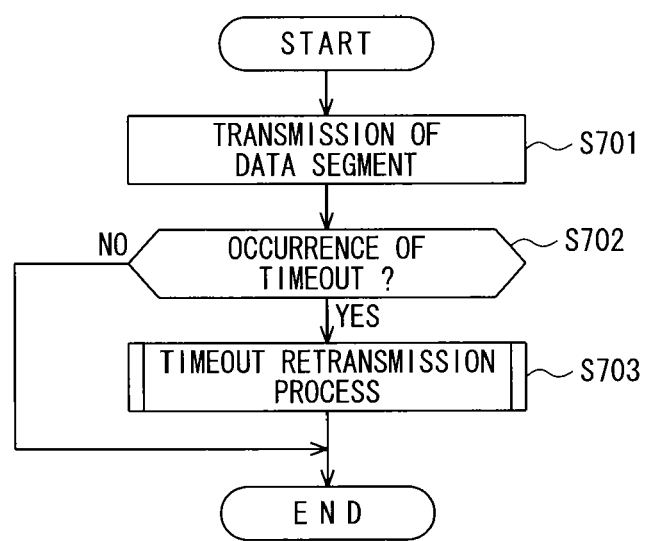
FIG. 7 is a flowchart indicative of flows of processes in the server device according to the present embodiment.

FIG. 7 is a flowchart illustrative of a flow of the processes of the server device 10 according to the present embodiment.

Firstly, the transmission unit 101 of the server device 10 transmits data segments to the communication terminal 30 (S701).

Next, the timeout determination unit 102 determines whether or not a timeout occurs at a data segment transmitted at step S701 (S702). When a timeout occurs, in other words, when an ACK has not been received from the communication terminal 30 within a retransmission timeout period, processing goes to a timeout retransmission process (S703). When a timeout does not occur, in other words, when an ACK is received within a retransmission timeout period, the processing is terminated.

Then, the timeout retransmission process at step S703 will proceed. Additionally, the timeout retransmission process will be described below.

(Timeout Retransmission Process)

Figure 8:
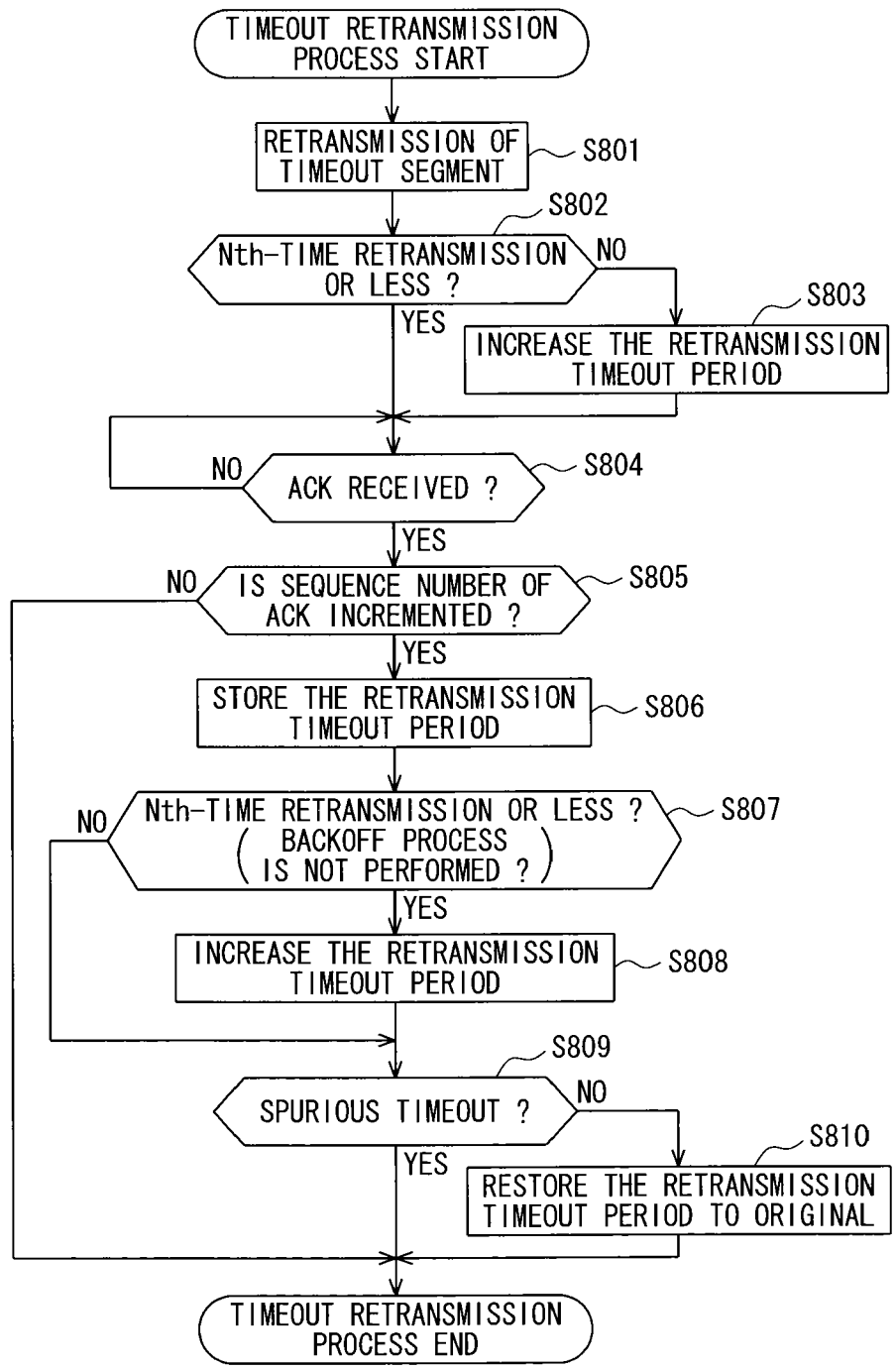
FIG. 8 is a flowchart indicative of flows of timeout transmission processing.

Next, a detailed example of the timeout retransmission process will be described with reference to FIG. 8. FIG. 8 is a flowchart illustrative of the flow of the timeout retransmission process. This timeout retransmission process is a process to be performed at step S703 of FIG. 7.

Initially, the retransmission unit 103 causes the transmission unit 101 to retransmit the timeout segment (step S801).

Then, the retransmission at step S801 is determined whether it is n times or less (step S802). If it is n-time retransmission or less, the backoff process is not executed for the retransmission timeout period. Processing goes to step S804. If it is not n-time retransmission or less (that is n+1 time retransmission or more), the retransmission timeout period is increased for performing the backoff process for the retransmission timeout period (step S803). Then, the processing goes to step S804. Specifically, the above steps S802 and S803 are executed at the retransmission timeout period increase unit 105.

Subsequently, whether or not an ACK (first acknowledgement) is received is determined (step S804). However, this step is repeated until the ACK is received, and when the ACK is received, processing goes to step S805. Then, whether or not the sequence number of the ACK received at step S804 is greater than the sequence number of the previously-received ACK (step S805). If the sequence number of the ACK is incremented, the processing goes to step S806. If the sequence number of the ACK is not incremented, the timeout retransmission process is terminated.

At step S806, the retransmission timeout period is temporarily stored. This is to turn back the retransmission timeout period, which will be increased at below-mentioned step S808, when the timeout is determined not to be the spurious timeout at below-mentioned step S809.

At step S807, whether the segment retransmitted by the transmission unit 101 is determined to be n-time retransmission or less (i.e., whether the backoff process is performed). If it is n-time retransmission or less, the backoff process is not performed and the retransmission timeout period is increased (step S808). Processing goes to step S809. If it is not n-time retransmission or less, the backoff process has been already performed at step S802. Therefore, the processing goes to step S809 without executing anything. Additionally, the above steps S807 and S808 are performed at the retransmission timeout period increase unit 105.

After that, the timeout is determined whether it is a spurious timeout (S809). If it is not a spurious timeout, the retransmission timeout period that is increased at step S808 is restored to an original period by use of the retransmission timeout period temporarily stored at step S806 (step S810). If it is a spurious timeout, the timeout retransmission process is terminated. Specifically, the process at step S809 is performed by the spurious timeout determination unit 104. The spurious timeout determination unit 104 is capable of determining that the retransmission timeout that has occurred should be a spurious timeout, with a fact that the sequence number of the ACK at step S805 is greater than the previously received one and with another fact that the sequence number of an ACK (second acknowledgement) to be received next time is greater than the previously received one.

(Communication Method)

The following communication method is implemented in the above-described communication system. That is, transmitting data segments and receiving acknowledgements in response to the data segments, respectively and sequentially, suppressing an application of a backoff algorithm for increasing a retransmission timeout period at the time of retransmitting a data segment, and controlling the retransmission timeout period to retransmit the data segment, the communication method comprising: determining a spurious timeout based upon an acknowledgement received immediately after the retransmission of the data segment (which corresponds to step S809 of FIG. 8, for example); and increasing the retransmission timeout period, when an occurrence of the spurious timeout is determined by the spurious timeout determination unit (which corresponds to step S808 of FIG. 8, for example).

According to this communication method, even if the application of the backoff algorithm is suppressed at the time of data retransmission, the retransmission timeout period can be increased in an event when the spurious timeout occurs. This makes it possible to avoid the situation where once the spurious timeout occurs while the application of the backoff algorithm is being suppressed, the spurious timeout will continuously occur since then.

CONCLUSION

As described heretofore, according to an aspect of the present invention, it is made possible to avoid the situation where once the spurious timeout occurs while the backoff algorithm is being suppressed at the time of retransmission of a data segment, the spurious timeout will continuously occur since then. Also, in particular, when the retransmission timeout value is set shorter than the RTT, the spurious timeout occurs with ease.

Accordingly, the present invention is more effective.

Also, in the above description, it is assumed that the F-RTO algorithm be employed for detecting the spurious timeout. However, even if another algorithm is employed, as long as the algorithm is configured such that a new segment is transmitted in response to the first acknowledgement received immediately after the retransmission of the data segment, there will be a problem of the continuous occurrence of the spurious timeout in the same manner. Accordingly, the present invention will be effective in such a case. In other words, the present invention is not limited to a case where the F-RTO is employed.

REFERENCE SIGNS LIST 1 wireless network
10 server device
101 transmission unit
102 timeout determination unit
103 retransmission unit
104 spurious timeout determination unit
105 retransmission timeout period increase unit
11 CPU
12 non-volatile memory device
121 communication program
13 RAM
14 network interface
20 radio controller
30 communication terminal
31 wireless interface
32 IP process unit
33 TCP process unit
34 application process unit

The invention claimed is:

1. A communication device comprising:
a transmission unit configured for transmitting data segments and receiving acknowledgements in response to the data segments, respectively and sequentially;
a retransmission unit configured for suppressing an application of a backoff algorithm for increasing a retransmission timeout period at the time of retransmitting a data segment, and controlling the retransmission timeout period to retransmit the data segment;
a spurious timeout determination unit configured for determining a spurious timeout based upon an acknowledgement received immediately after the retransmission of the data segment; and
a retransmission timeout increase unit configured for increasing the retransmission timeout period, when an occurrence of the spurious timeout is determined by the spurious timeout determination unit;
wherein the acknowledgements are applied with sequence numbers, respectively;
and wherein the spurious timeout determination unit determines the occurrence of the spurious timeout, when a first sequence number of a first acknowledgement received immediately after the retransmission of the data segment is greater than a previously received one, and when a second sequence number of a second acknowledgement received immediately after the first acknowledgement is not a duplicate acknowledgement and is greater than the previously received one.

2. The communication device according to claim 1, wherein the retransmission timeout increase unit increases the retransmission timeout period for transmitting at least one new data segment in response to the first acknowledgement received immediately after the retransmission of the data segment, while the application of the backoff algorithm being suppressed.

3. The communication device according to claim 1, wherein the retransmission timeout increase unit doubles the retransmission timeout period.

4. The communication device according to claim 1, wherein the spurious timeout determination unit determines the spurious timeout with a Forward RTO-Recovery (F-RTO) algorithm.

5. A communication method comprising steps of:
transmitting data segments and receiving acknowledgements in response to the data segments, respectively and sequentially;
suppressing an application of a backoff algorithm for increasing a retransmission timeout period at the time of retransmitting a data segment, and controlling the retransmission timeout period to retransmit the data segment;
determining a spurious timeout based upon an acknowledgement received immediately after the retransmission of the data segment; and
increasing the retransmission timeout period, when an occurrence of the spurious timeout is determined;

wherein the acknowledgements are applied with sequence numbers, respectively;

and wherein the step of determining determines the occurrence of the spurious timeout, when a first sequence number of a first acknowledgement received immediately after the retransmission of the data segment is greater than a previously received one, and when a second sequence number of a second acknowledgement received immediately after the first acknowledgement is not a duplicate acknowledgement and is greater than the previously received one.

6. A communication device comprising:

a transmission unit configured for transmitting data segments and receiving acknowledgements in response to the data segments, respectively and sequentially;

a retransmission unit configured for suppressing an application of a backoff algorithm for increasing a retransmission timeout period at the time of retransmitting a data segment, and controlling the retransmission timeout period to retransmit the data segment;

a spurious timeout determination unit configured for determining a spurious timeout based upon an acknowledgement received immediately after the retransmission of the data segment; and a retransmission timeout increase unit configured for increasing the retransmission timeout period, when an occurrence of the spurious timeout is determined by the spurious timeout determination unit;

wherein the retransmission timeout increase unit does not increase the retransmission timeout period when the backoff algorithm is applied in transmitting an untransmitted data segment, and the retransmission timeout increase unit increases the retransmission timeout period for transmitting at least one new data segment to be transmitted in accordance with the acknowledgement received immediately after the retransmission unit retransmits the data segment when application of the backoff algorithm is suppressed.

* * * * *